(12) United States Patent
Suzuki

(10) Patent No.: US 8,336,423 B2
(45) Date of Patent: Dec. 25, 2012

(54) THROTTLE GRIP APPARATUS

(75) Inventor: Michiyuki Suzuki, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 302 days.

(21) Appl. No.: 12/645,775

(22) Filed: Dec. 23, 2009

(65) Prior Publication Data

US 2010/0162848 A1 Jul. 1, 2010

(30) Foreign Application Priority Data

Dec. 25, 2008 (JP) .............................. P.2008-329638

(51) Int. Cl.
G05G 1/08 (2006.01)
(52) U.S. Cl. ......................................................... 74/504
(58) Field of Classification Search .................... 74/504, 74/506
See application file for complete search history.

(56) References Cited

U.S. PATENT DOCUMENTS

| | | | | |
|---|---|---|---|---|
| 5,134,897 | A | * | 8/1992 | Romano ........................ 74/489 |
| 6,840,096 | B2 | * | 1/2005 | Samoto et al. ............. 73/114.36 |
| 6,978,694 | B2 | * | 12/2005 | Peppard ........................ 74/489 |
| 2004/0107789 | A1 | | 6/2004 | Peppard |
| 2005/0251301 | A1 | | 11/2005 | Suzuki |
| 2010/0307282 | A1 | * | 12/2010 | Yaguchi ........................ 74/504 |

FOREIGN PATENT DOCUMENTS

| | | |
|---|---|---|
| DE | 10027193 A1 | 12/2001 |
| EP | 1338502 A1 | 8/2003 |
| JP | 4-254278 A | 9/1992 |
| JP | 2003-252274 A | 9/2003 |
| WO | 2008010186 A2 | 1/2008 |

OTHER PUBLICATIONS

Extended European Search Report for Application No. 09179775.3-2425, dated Feb. 16, 2010.

* cited by examiner

Primary Examiner — Vicky Johnson
(74) Attorney, Agent, or Firm — Sughrue Mion, PLLC

(57) ABSTRACT

A throttle grip apparatus is provided with: a throttle grip (1) rotatably mounted on a leading end of a handle bar (H) of a vehicle; a magnet (6) rotatable together with the throttle grip (1); a detector (13) for detecting variations in a magnetic field of the magnet (6) in a non-contact manner to detect a rotation angle of the throttle grip (1); and a frictional plate (9, 10) for generating a rotation load of the throttle grip (1). An engine of the vehicle is controlled based on a detected value of the detector (13). The frictional plate (9, 10) is disposed within the handle bar (H).

2 Claims, 6 Drawing Sheets

THROTTLE GRIP APPARATUS

BACKGROUND OF THE INVENTION

1. Field of the Invention

The present invention relates to a throttle grip apparatus for controlling an engine of a vehicle according to a rotation angle of a throttle grip.

2. Background Art

Recently, there has been spread a motorcycle of a type that, a rotation angle of a throttle grip is detected using a throttle opening angle sensor such as a potentiometer and the thus detected value of the rotation angle is sent as an electric signal to an electronic control unit or the like incorporated in the motorcycle. The electronic control unit carries out a given operation according to such detection signal, and an ignition timing of the engine or an opening/closing of an exhaust valve can be controlled according to results of such operation.

For example, in the patent reference 1 (JP-A-04-254278), there is disclosed a throttle grip apparatus having the above-mentioned structure. Such throttle grip apparatus includes mainly a drive pulley portion rotatable in linking with a throttle grip, a detecting gear meshingly engageable with a gear formed in a portion of the drive pulley portion, a potentiometer for detecting a rotation angle of the detecting gear, and a case for storing these composing elements therein. In operation, when a driver rotates the throttle grip, the potentiometer is rotated through the drive pulley portion to thereby detect an opening angle of the throttle grip.

In the above-cited throttle grip apparatus, since the rotation angle of the throttle grip is detected using a throttle opening angle sensor, there is eliminated a need for use of a general-purpose operation cable which transmits a rotation movement of the throttle grip to an engine side. However, this structure also eliminates a sliding resistance that is conventionally generated by the sliding movement of an inner tube relative to an outer tube forming the general-purpose operation cable when the throttle grip is rotated. Therefore, as a force to be transmitted to the driver side when the throttle grip is rotated, there can be provided only a force of a return spring that returns the throttle grip to its initial position, which causes the driver to feel uncomfortable.

In order to solve the above inconvenience, for example, as disclosed in the patent reference 2 (JP-A-2003-252274), there is proposed a throttle grip apparatus structured such that a frictional plate, when the throttle grip is rotated, for applying a frictional force going in the opposite direction to a rotation direction of the throttle grip is disposed in a case fixed at a position adjacent to the throttle grip, and a frictional force generated by the frictional plate is used to produce a rotation load of the throttle grip. According to such prior-art throttle grip apparatus, the use of a throttle wire can be eliminated and also a driver is allowed to operate the throttle grip without feeling uncomfortable.

However, in the conventional throttle grip apparatus including the above frictional plate, since the friction plate is disposed in the case fixed at the position adjacent to the throttle grip, although the rotation load of the throttle grip can be obtained when the throttle grip is rotated, there is raised a problem that the throttle grip apparatus itself increases in size.

[Patent Reference 1] JP-A-04-254278
[Patent Reference 2] JP-A-2003-252274

SUMMARY OF THE INVENTION

One or more embodiments of the invention provide a throttle grip apparatus which, in spite of omission of a throttle wire, allows a driver to operate a throttle grip without feeling uncomfortable and also can be reduced in size.

In accordance with one or more embodiments of the invention, a throttle grip apparatus is provided with: a throttle grip (1) rotatably mounted on a leading end of a handle bar (H) of a vehicle; a magnet (6) rotatable together with the throttle grip (1); a detector (13) configured to detect variations in a magnetic field of the magnet (6) in a non-contact manner to detect a rotation angle of the throttle grip (1) based on a detected value of the detector (13); and a frictional plate (9, 10) configured to generate a resistance to a rotation of the throttle grip (1) to generate a rotation load of the throttle grip (1). An engine of the vehicle is controlled based on the detected value of the detector (13). The frictional plate (9, 10) is disposed within the handle bar (H).

According to the above structure, since the frictional plate, when the throttle grip is rotated, capable of generating resistance to thereby generate the rotation load of the throttle grip is disposed within the handle bar, even when a throttle wire is omitted, the throttle grip can be operated with no uncomfortable feeling.

The throttle grip apparatus may further be provided with a resistance adjustor (S1, 4, 5) configured to adjust the resistance generated by the frictional plate (9, 10).

According to the above structure, by the resistance adjustor capable of arbitrarily adjusting the resistance generated by the frictional plate, the rotation load of the throttle grip can be arbitrarily changed according to the taste of a driver and, even when the throttle wire is omitted, the driver is allowed to operate the throttle grip without feeling uncomfortable.

The frictional plate (9, 10) may include: a rotation side frictional plate (9) rotatable together with the throttle grip (1); and a fixed side frictional plate (10) which is fixed to an interior of the handle bar (H) and is in contact with the rotation side frictional plate (9). The resistance adjustor may include: an urging member (S1) configured to press the rotation side frictional plate (9) against the fixed side frictional plate (10); and an adjusting mechanism (4, 5) configured to change an urging force of the urging member (S1) from outside. By operating the adjusting mechanism (4, 5), a pressing force of the rotation side frictional plate (9) against the fixed side frictional plate (10) may be adjusted.

According to the above structure, the frictional plate includes a rotation side frictional plate rotatable together with the throttle grip and a fixed side frictional plate fixed to the interior of the handle bar and contacted with the rotation side frictional plate, and the resistance adjustor includes an urging member for pressing the rotation side frictional plate against the fixed side frictional plate and an adjusting mechanism capable of arbitrarily changing the urging force of the urging member from outside. Therefore, by operating the adjusting mechanism, the pressing force of the rotation side frictional plate against the fixed side frictional plate can be adjusted. This structure makes it possible to adjust more easily the resistance generated by the frictional plate.

The adjusting mechanism (4, 5) may include a tool fit-shape portion (4ba) facing a leading end of the throttle grip (1). The urging force of the urging member (S1) may be changed by fitting a tool with the tool fit-shape portion (4ba) and rotating the adjusting mechanism (4).

According to the above structure, since the adjusting mechanism includes a tool fit-shape portion facing the leading end of the throttle grip and, when a tool is fitted with the tool fit-shape portion and the adjusting mechanism is rotated, the urging force of the urging member can be changed arbitrarily, the frictional generated by the frictional plate can be adjusted still more easily.

Other aspects and advantages of the invention will be apparent from the following description, the drawings and the claims.

DETAILED DESCRIPTION OF THE EXEMPLARY EMBODIMENTS

Figure 1:
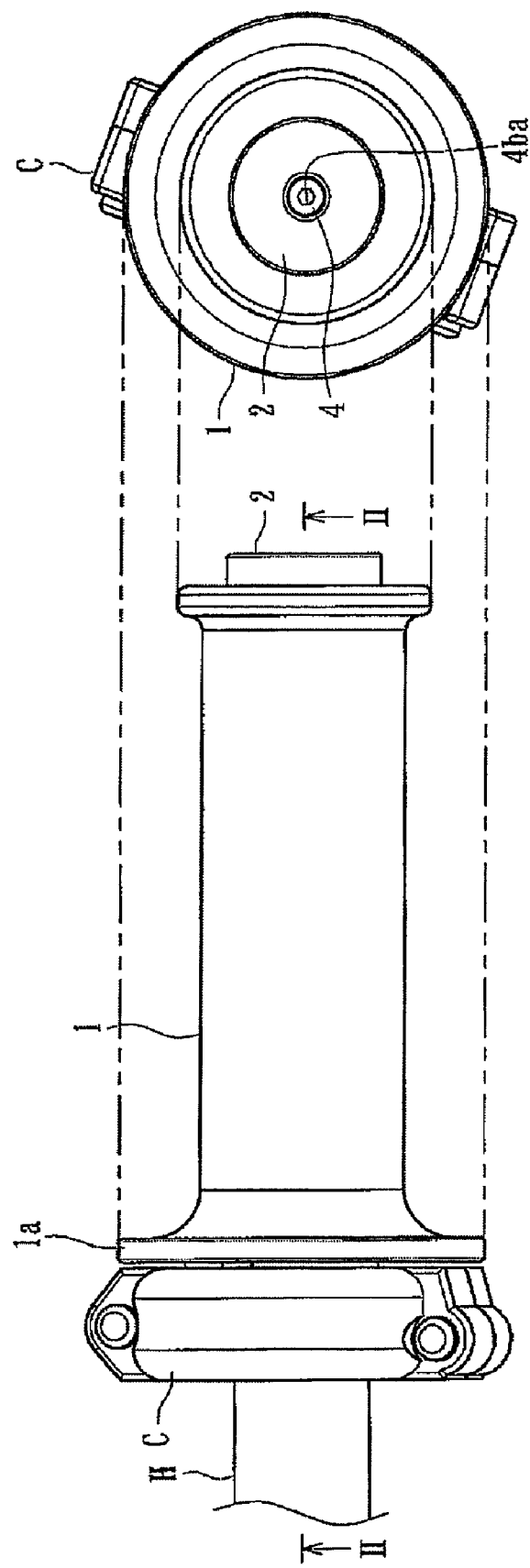
FIG. 1 is an outside view of a throttle grip apparatus according to a first embodiment of the invention.

Exemplary embodiments of a throttle grip apparatus according to the invention are described with reference to accompanying drawings.

First Exemplary Embodiment

A throttle grip apparatus according to a first embodiment of the invention is used to detect a rotation angle of a throttle grip mounted on a handle bar of a motorcycle and also to transmit a detected signal to an electronic control unit such as ECU mounted in the motorcycle. As shown in FIGS. 1 to 4, the handle grip apparatus includes, as its main composing elements, a throttle grip 1, a magnet 6, an angle sensor 13 serving as a detector, a rotation side frictional plate 9 and a fixed side frictional plate 10 respectively disposed within a handle bar H, and an energizing member S1 and an adjusting mechanism (a bolt member 4 and an adjusting member 5) cooperating together in constituting a resistance adjustor.

The throttle grip 1 is mounted on a leading end portion of the handlebar H of the motorcycle and can be rotated relative to the handle bar H coaxially therewith. An outer peripheral surface of the throttle grip 1 provides a grip portion which can be gripped by a driver, while the throttle grip 1 includes a flange portion 1a on a base end side thereof. On an inner peripheral surface of the throttle grip 1, there is provided a substantially cylindrical linking cylindrical member 2, while the linking cylindrical member 2 can be rotated together with the throttle grip 1.

Figure 2:
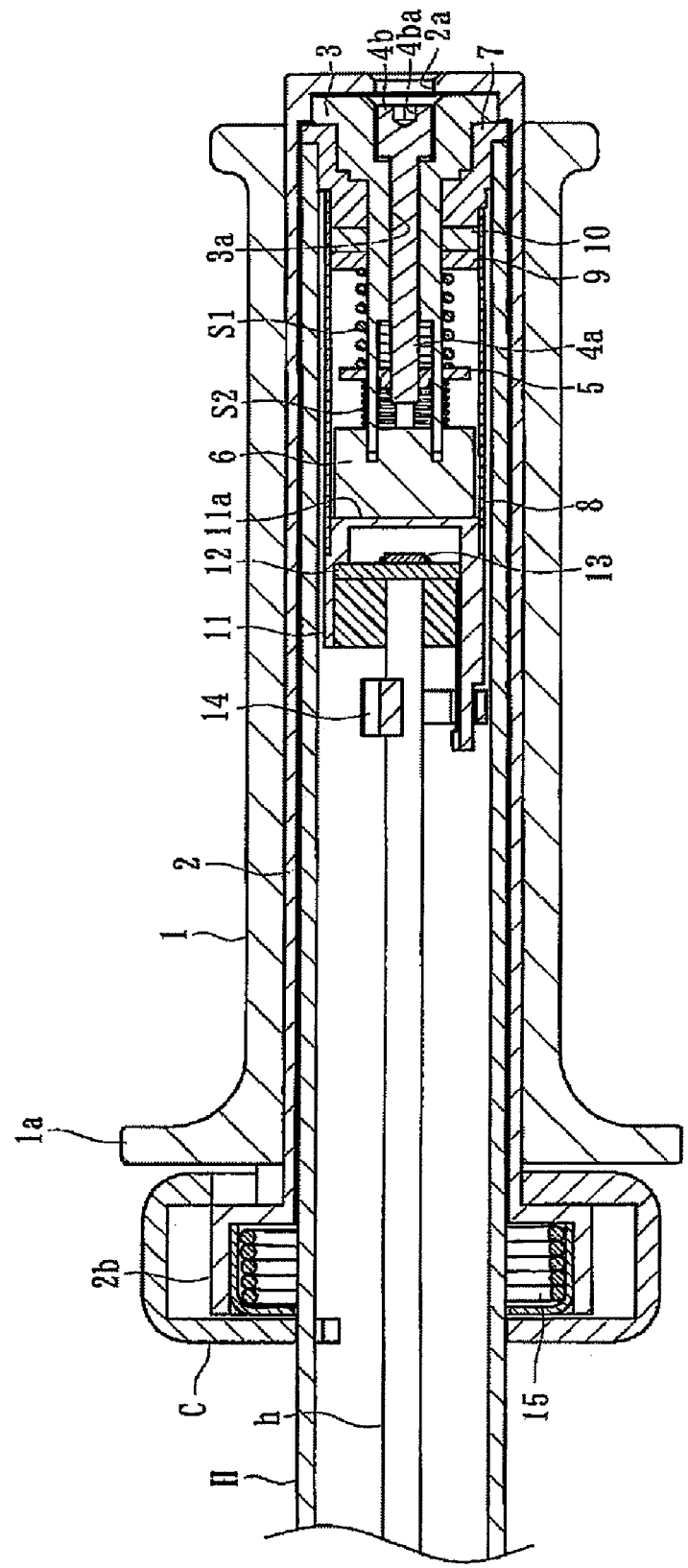
FIG. 2 is a section view taken along the II-II line shown in FIG. 1.

In an interior portion of the linking cylindrical member 2, specifically, on a right end side thereof in FIG. 2, there are disposed a fixed member 7 fixed to the handle bar H and a linking member 3 fixed to the linking cylindrical member 2. The linking member 3 includes a penetration hole 3a formed in a central portion thereof in a longitudinal direction, while a bolt member 4 is rotatably inserted into the penetration hole 3a. The bolt member 4 includes a male screw portion 4a having a male screw formed in an outer peripheral surface thereof and a head portion 4b, while a tool fit-shape portion 4ba is formed in the head portion 4b.

Further, a leading end face of the linking cylindrical member 2 includes an opening 2a formed substantially in a center thereof, while the tool fit-shape portion 4ba is allowed to face an outside through the opening 2a. That is, the bolt member 4 includes the tool fit-shape portion 4ba facing the leading end side of the throttle grip 1, whereby a tool can be fitted with the tool fit-shape portion 4ba and the bolt member 4 can be rotated using the tool. Here, in the present embodiment, the tool fit-shape portion 4ba is formed to have a hexagonal shape with which a hexagonal wrench can be fitted.

Into the leading end (in the drawings, the left end including multiple leg portions) of the linking member 3, there is fitted the magnet 6, whereby the magnet 6 can be rotated together with the linking member 3. According to this structure, when the throttle grip 1 is rotated, the magnet 6 is also rotated together with the linking cylindrical member 2 and linking member 3, whereby a magnetic field generated in the portion that faces the magnet 6 is allowed to vary according to the rotation angle of the magnet 6. Here, the magnet 6 may be a permanent magnet or may be other type magnet (for example, a plastic magnet) which is capable of generating a magnetic field.

The angle sensor 13 (a detector) is used to detect variations in the magnetic field of the magnet 6 in a non-contact manner and to detect the rotation angle of the throttle grip 1 according to the value of the detected magnetic field variation; and, the angle sensor 13 is made of a chip-shaped member formed in a base plate 12. Here, the base plate 12 includes not only the angle sensor 13 capable of increasing or decreasing an output voltage according to variations in the magnetic field caused by the magnet 6 but also an amplifier portion for amplifying the output signal of the angle sensor 13. Use of such angle sensor 13 can facilitate the setting of a zero point (a signal of an initial position). The base plate 12 and angle sensor 13 are respectively stored within a storage member 11. The storage member 11 includes a storage space in the interior portion thereof and is fixed through a fixed cylindrical member 8 to the fixed member 7.

From the base plate 12, there is guided a cord h which extends within the handle bar H and is used to send an amplified detection signal to the outside. Here, in FIG. 2, reference numeral 14 designates a binding band which is used to fix the cord h. Also, in a state where the base plate 12 is stored in the storage member 11, specific resin is filled into the storage member 11, whereby the base plate 12 can be molded with the resin. Thus, when the magnet 6 rotates with the rotation of the throttle grip 1, the output signal of the angle sensor 13 is increased or decreased due to variations in the magnetic field that is generated from the magnet 6; and, therefore, the rotation angle of the throttle grip 1 can be detected according to the output signal. The thus obtained detection signal is transmitted through the cord h to an ECU incorporated in a motorcycle, whereby the engine can be controlled according to the detection signal (that is, the engine can be controlled according to the rotation angle of the throttle grip 1).

On such side of the interior portion of the fixed cylindrical member 8 as faces the fixed member 7, there is fixed the fixed side frictional plate 10 and also there is disposed the rotation side frictional plate 9 in such a manner that the surface thereof is in contact with the fixed side frictional plate 10. The rotation side frictional plate 9 can be rotated together with the throttle grip 1 and also the surface thereof is pressed against the surface of the fixed side frictional plate 10 by an energizing member S1 made of a coil spring. Thus, when the throttle grip 1 is rotated, the rotation side frictional plate 9 is rotated while it is pressed against the fixed side frictional plate 10, whereby there can be generated resistance and thus the rotation load of the throttle grip 1 when the throttle grip 1 is rotated.

Figure 3:
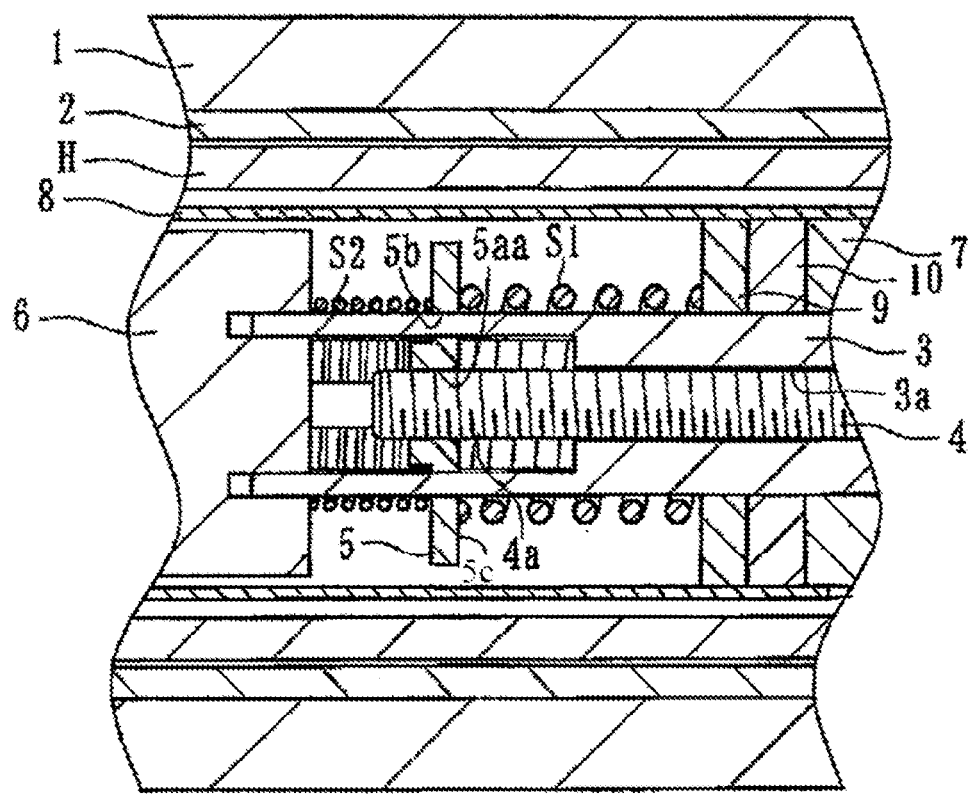
FIG. 3 is an enlarged section view of such portion of the above throttle grip apparatus as exists near to an adjusting member.
Figure 3:
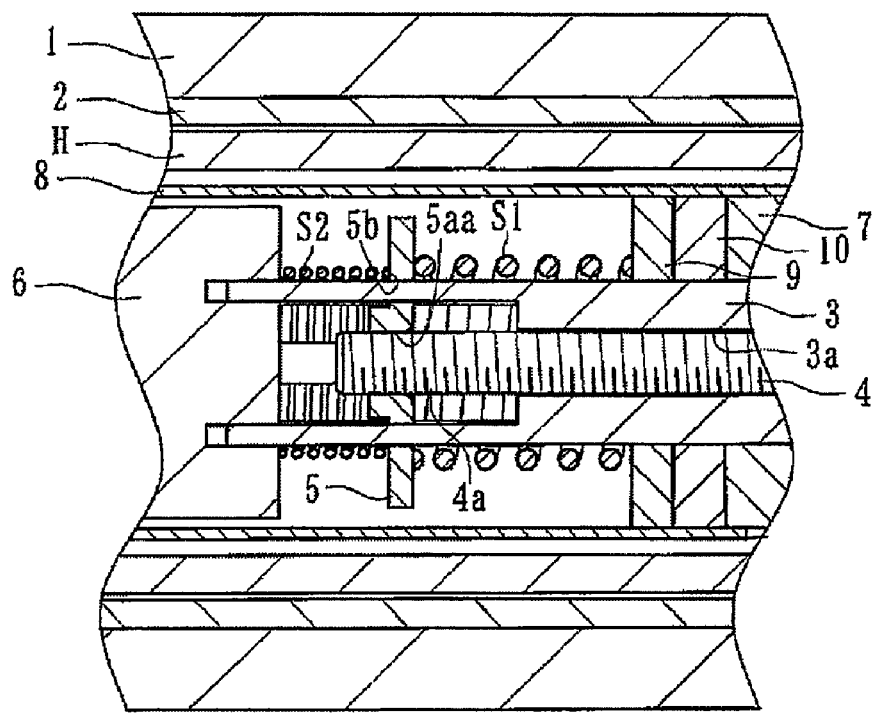
Figure 4:
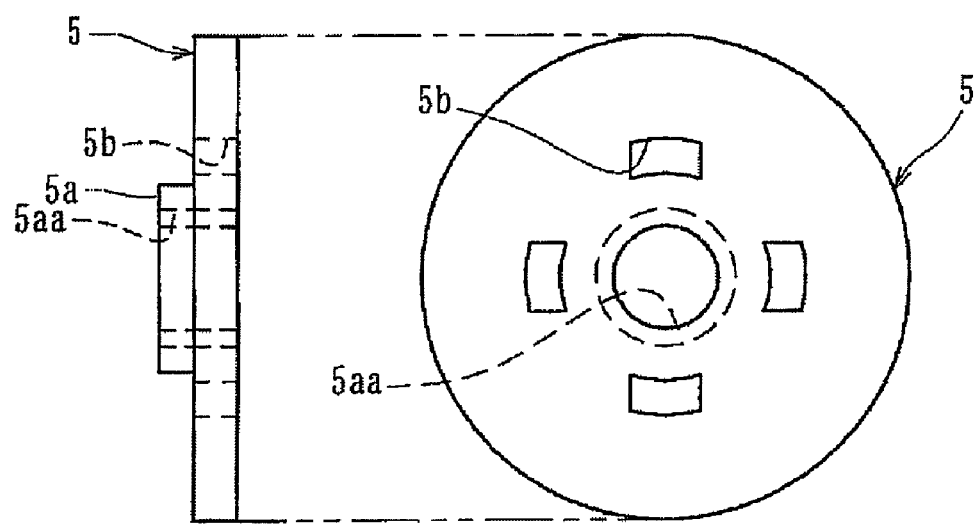
FIG. 4 is a side view and a front view of the adjusting member of the throttle grip apparatus.

Into a given portion of the linking member 3, as shown in FIG. 3, there is inserted an adjusting member 5, while the adjusting member 5 is structured such that it is allowed to slide in the longitudinal direction (in FIG. 3, in the right and left direction) of the linking member 3. That is, in the adjusting member 5, as shown in FIG. 4, there are formed multiple holes 5b in a concentric circle manner; and, when the leg portions of the linking member 3 are inserted into these holes 5b respectively, the adjusting member 5 is allowed to slide in the axial direction of the linking member 3 and is prevented from moving in the peripheral direction.

Further, the adjusting member 5 includes a burring portion 5a (rising portion) formed by burring the central portion of the adjusting member 5 and, in the inner periphery of the burring portion 5a, there is formed a female screw 5aa which can be engaged with the male screw 4a of the bolt member 4. Thus, when the bolt member 4 is rotated around its axis, the adjusting member 5 is allowed to move along the male screw 4a in the right and left direction in FIG. 3. Also, since one end of the energizing member S1 is contacted with one surface 5c of the adjusting member 5 and the other end is contacted with the rotation side frictional plate 9, when the adjusting member 5 moves right and left, the urging force (pressing force) of the energizing member S1 to be applied onto the rotation side frictional plate 9 can be adjusted.

For example, when a tool is fitted with the tool fit-shape portion 4ba and the bolt member 4 is rotated in a given direction, the adjusting member 5 is moved right in FIG. 3 (in a direction to approach the rotation side frictional plate 9) to thereby be able to decrease the whole length of the energizing member 51 made of a coil spring, whereby the urging force (pressing force) of the energizing member S1 to be applied onto the rotation side frictional plate 9 can be increased. This can increase the resistance generated when the throttle grip 1 is rotated and thus the rotation load of the throttle grip 1 can be increased.

On the other hand, when a tool is fitted with the tool fit-shape portion 4ba and the bolt member 4 is rotated in the opposite direction to the above-mentioned given direction, the adjusting member 5 is moved left in FIG. 3 (in a direction to move away from the rotation side frictional plate 9) to thereby be able to increase the whole length of the energizing member S1 made of a coil spring, whereby the urging force (pressing force) of the energizing member S1 to be applied onto the rotation side frictional plate 9 can be decreased. This can decrease the resistance generated when the throttle grip 1 is rotated and thus the rotation load of the throttle grip 1 an be decreased.

Also, one end of a spring S2 is contacted with the other surface 5d of the adjusting member 5. The other end of the spring S2 is contacted with the magnet 6, whereby the spring S2 is capable of pressing the magnet 6 against the surface 11a of the storage member 11. Thanks to this structure, the magnet 6 is allowed to rotate together with the throttle grip 1 while it is pressed against the surface 11a of the storage member 11, thereby being able to prevent the spacing dimension of the magnet 6 relative to the angle sensor 13 from being shifted due to the vibrations of the motorcycle, which can enhance the precision of the throttle grip apparatus further. Here, as described above, since, a tool is fitted with the tool fit-shape portion 4ba and the bolt member 4 is rotated using the tool, the adjusting member 5 is moved right or left in FIG. 3, by decreasing or increasing the whole length of the coil spring S2, the pressing force of the magnet 6 on the surface 11a can be adjusted.

According to the present embodiment, to such position of the handle bar H as adjoins the throttle grip 1, there is fixed a case C; and, within the case C, there is stored an increased diameter portion 2b which is formed on the base end side of the linking member 2. Within the increased diameter portion 2b, there is disposed a return spring 15. One end of the return spring 15 is fixed to the increased diameter portion 2b, while the other end is fixed to the case C side of the linking member 2. When the gripping force of the hand of the driver having rotated the throttle grip 1 is loosened, the throttle grip 1 can be rotated toward its initial position.

According to the present embodiment, since the frictional plates (rotation side frictional plate 9 and fixed side frictional plate 10), when the throttle grip 1 is rotated, capable of generating the resistance and thus the rotation load of the throttle grip 1 are disposed within the handle bar H, even when the throttle wire is omitted, the throttle grip 1 can be operated with no uncomfortable feeling and also the size of the throttle grip apparatus can be reduced. Also, since the cord h for transmitting the detection signal of the angle sensor 13 to the outside is disposed so as to extend within the handle bar H, the handling of the cord h can be facilitated, which can enhance the design of the appearance of the throttle grip apparatus.

Further, the frictional plates include the rotation side frictional plate 9 which can be rotated together with the throttle grip 1, and the fixed side frictional plate 10 which is fixed to the interior of the handle bar H and is contacted with the rotation side frictional plate 9. The resistance adjusting unit includes the energizing member S1 for pressing the rotation side frictional plate 9 against the fixed side frictional plate 10, and the adjusting mechanism (bolt member 4 and adjusting member 5) capable of arbitrarily changing the urging force of the energizing member S1 from outside through the opening 2a. According to the resistance adjusting unit, since, by operating the adjusting mechanism, the pressing force of the rotation side frictional plate 9 against the fixed side frictional plate 10 can be adjusted, the resistance generated by the frictional plates can be adjusted more easily.

Still further, according to the present embodiment, since there is provided the resistance adjusting unit (energizing member S1, bolt member 4 and adjusting member 5) which is capable of arbitrarily adjusting the resistance to by the frictional plates (rotation side frictional plate 9 and fixed side frictional plate 10), the rotation load of the throttle grip 1 can be arbitrarily changed according to the taste of a driver and, in spite of omission of the throttle wire, the throttle grip 1 can be operated with no uncomfortable feeling. The adjusting mechanism includes the tool fit-shape portion 4ba facing the leading end of the throttle grip 1 and is structured such that, by fitting a tool with the tool fit-shape portion 4ba and rotating the adjusting unit, the urging force of the energizing member S1 can be changed arbitrarily. Therefore, the resistance to be generated by the frictional plates (rotation side frictional plate 9 and fixed side frictional plate 10) can be adjusted still more easily.

Second Exemplary Embodiment

Description will be given below of a second embodiment of a throttle grip apparatus according to the invention.

Figure 5:
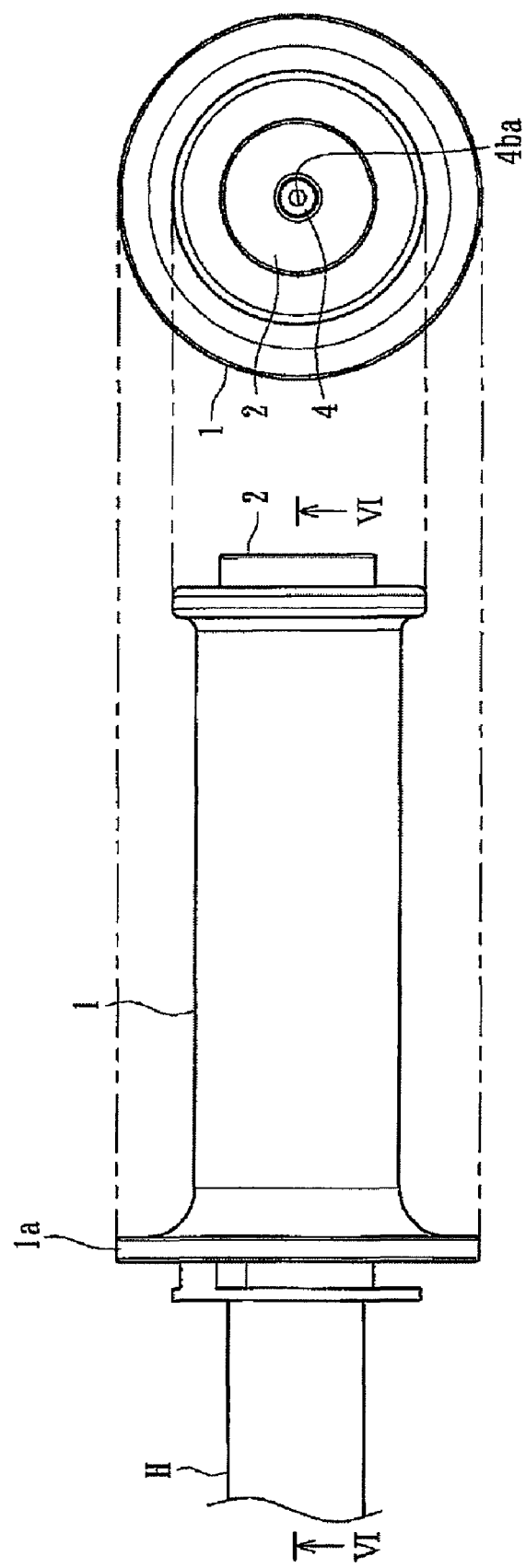
FIG. 5 is an outside view of a throttle grip apparatus according to a second embodiment of the invention.
Figure 6:
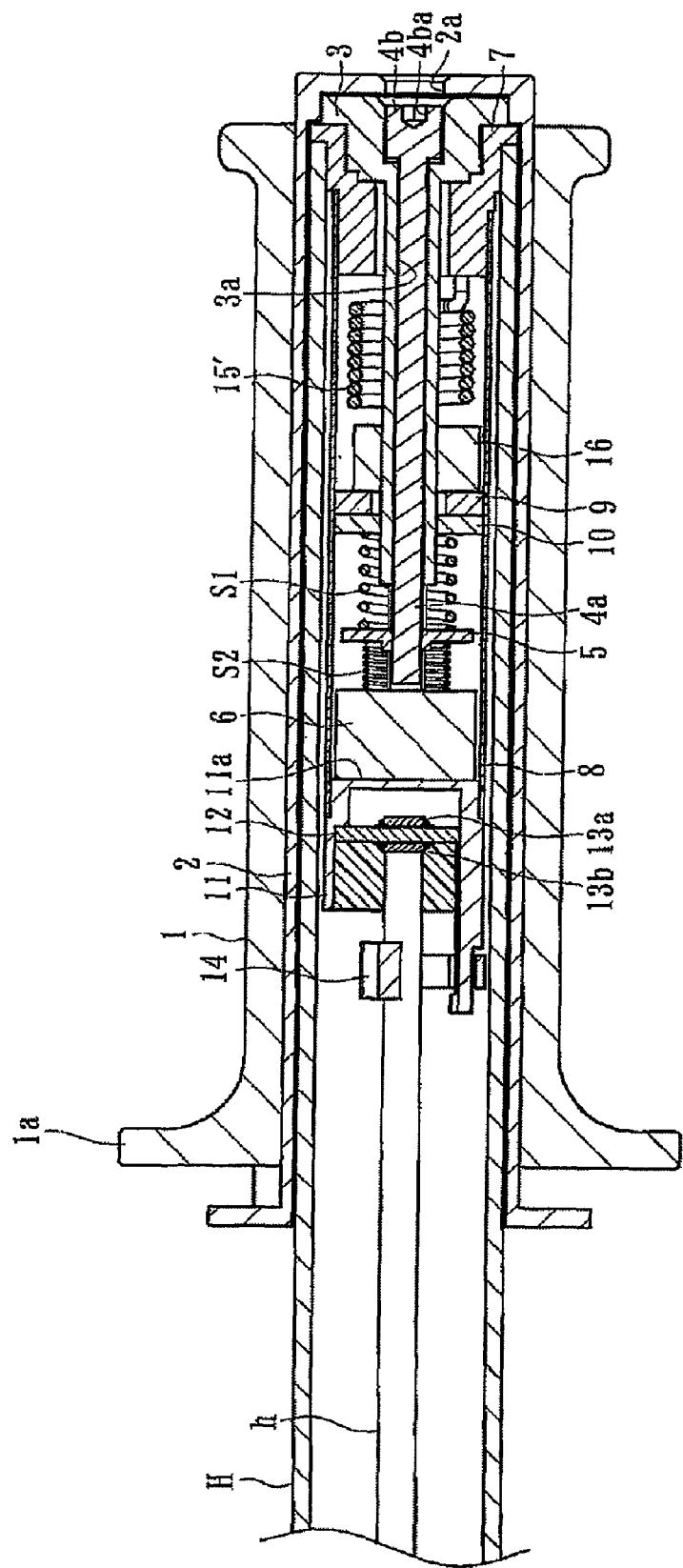
FIG. 6 is a section view taken along the VI-VI line shown in FIG. 5.

A throttle grip apparatus according to the present embodiment, similarly to the first embodiment, is used to detect the rotation angle of a throttle grip mounted on a handlebar of a motorcycle and to transmit the thus detected signal to an electronic control unit such as ECU mounted in the motorcycle. As shown in FIGS. 5 and 6, the present handle grip apparatus includes, as its main composing elements, a throttle grip 1, a magnet 6, an angle sensor 13, a rotation side frictional plate 9 and a fixed side frictional plate 10 respectively disposed within a handle bar H, and an energizing member S1 and an adjusting mechanism (a bolt member 4 and an adjusting member 5) cooperating together in constituting a resistance adjusting unit. Here, the composing elements of the present embodiment similar to those of the first embodiment are given the same designations and thus the detailed description thereof is omitted here.

Within the fixed cylindrical member 8 according to the present embodiment, there is disposed a return spring 15' for energizing the throttle grip 1 in the initial position direction and also a spring receiver 16 fixed to the linking member 3, while one end of the return spring 15' is secured to the spring receiver 16. Also, the other end of the return spring 15' is secured to the fixed member 7. When the gripping force of the hand of a driver having rotated the throttle grip 1 is loosed using the thus structured return spring 15', the throttle grip 1 can be rotated toward its initial position.

According to the present embodiment, similarly to the first embodiment, since the frictional plates (rotation side frictional plate 9 and fixed side frictional plate 10), when the throttle grip 1 is rotated, capable of generating the resistance and thus the rotation load of the throttle grip 1 are disposed within the handle bar H, even when the throttle wire is omitted, the throttle grip 1 can be operated with no uncomfortable feeling; and also, since the return spring 15' is provided within the handle bar H, the size of the throttle grip apparatus can be reduced still further.

Although description has been given heretofore of the exemplary embodiments of the invention, the invention is not limited to them. For example, as a condition indispensable for the structure of the invention, the frictional plates (rotation side frictional plate 9 and fixed side frictional plate 10) must be disposed within the handle bar H, but the resistance adjusting unit capable of arbitrarily adjusting the resistance to be generated the frictional plates may not be provided. Also, the resistance adjusting unit is not limited to the above-mentioned embodiments but other various units are also possible, provided that they can arbitrarily adjust the resistance to be generated by the frictional plates.

Further, instead of the angle sensor 13, there may also be employed other types of detecting members, provided that they can detect variations in the magnetic field of the magnet 6 in a non-contact manner and can detect the rotation angle of the throttle grip 1 according to the thus detected value. Here, in the above embodiments, the throttle grip apparatus is mounted on the handle bar of the motorcycle but it may also be mounted on other types of vehicles including a handle bar (for example, an ATV and a snowmobile).

The present invention can apply to various types of throttle grip apparatus having different appearances or having other functions, provided they are structured such that the frictional plates, when the throttle grip is rotated, capable of generating resistance and thus the rotation load of the throttle grip are disposed within the handle bar.

DESCRIPTION OF REFERENCE NUMERALS AND SIGNS

1: Throttle grip
2: Linking cylindrical member
3: Linking member
4: Bolt member (adjusting mechanism)
4ba: Tool fit-shape portion
5: Adjusting member (adjusting mechanism)
6: Magnet
7: Fixed member
8: Fixed cylindrical member
9: Rotation side frictional plate
10: Fixed side frictional plate
11: Storage member
12: Base plate
13: Angle sensor (a detector)
14: Binding band
15, 15': Return spring
16: Spring receiver
h: Cord
H: Handle bar
C: Case
S1: Energizing member
S2: Coil spring

What is claimed is:

1. A throttle grip apparatus comprising:
   a throttle grip rotatably mounted on a leading end of a handle bar of a vehicle;
   a magnet rotatable together with the throttle grip;
   a detector configured to detect variations in a magnetic field of the magnet in a non-contact manner to detect a rotation angle of the throttle grip based on a detected value of the detector;
   a frictional plate configured to generate a resistance to a rotation of the throttle grip to generate a rotation load of the throttle grip;
   a resistance adjusting unit configured to adjust the resistance generated by the frictional plate,
   wherein an engine of the vehicle is controlled based on the detected value of the detector,
   wherein the frictional plate is disposed within the handle bar, and
   wherein the resistance adjusting unit is operable from an outside of the throttle grip, and includes an adjusting member disposed within the handle bar and an urging member disposed between the frictional plate and the adjusting member, wherein the resistance adjusting unit causes the adjusting member to move in a direction away from the frictional plate to decrease the urging force of the urging member applied to the frictional plate and causes the adjusting member to move in a direction toward the frictional plate to increase the urging force of the urging member applied to the frictional plate in order to change the resistance of the frictional plate.

2. The throttle grip apparatus according to claim 1, wherein the resistance adjusting unit further includes a bolt member,
   wherein the bolt member includes a head portion and a screw portion that threadably engages with the adjusting member,
   wherein the urging member and the frictional plate are disposed between the adjusting member and the head portion in an axial direction of the bolt member, and
   wherein the friction plate is disposed between the urging member and the head portion in the axial direction of the bolt member.

* * * * *